US008420402B2

(12) United States Patent
He et al.

(10) Patent No.: US 8,420,402 B2
(45) Date of Patent: *Apr. 16, 2013

(54) COMPOUNDS RELATED TO ASSAYS

(75) Inventors: Jianjun He, Sunnyvale, CA (US); Anita Hong, Cupertino, CA (US); Qingheng Wang, Fremont, CA (US); Raman Khosrow Afshar, San Jose, CA (US); Ming Zhu, Fremont, CA (US); Vera Rakhmanova, Foster City, CA (US)

(73) Assignee: AnaSpec Incorporated, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/374,995

(22) Filed: Jan. 27, 2012

(65) Prior Publication Data
US 2012/0130057 A1 May 24, 2012

Related U.S. Application Data

(63) Continuation of application No. 12/804,739, filed on Jul. 28, 2010, now Pat. No. 8,129, 193.

(60) Provisional application No. 61/273,186, filed on Jul. 30, 2009.

(51) Int. Cl.
*C09B 29/16* (2006.01)
*G01N 33/52* (2006.01)
*C07D 311/82* (2006.01)
*C07D 311/86* (2006.01)
*C07D 311/88* (2006.01)

(52) U.S. Cl.
USPC ............ 436/120; 436/119; 436/172; 534/798; 534/839; 534/862; 534/879; 534/884; 549/223; 549/227; 562/47; 562/49; 562/52; 562/53; 562/71

(58) Field of Classification Search .......... 436/119–120, 436/166, 172; 534/798, 839, 862, 879, 884; 549/223, 227; 562/47, 49, 52–53, 71
See application file for complete search history.

(56) References Cited

U.S. PATENT DOCUMENTS

| | | | | |
|---|---|---|---|---|
| 2,062,368 A | * | 12/1936 | Maurer et al. | 562/55 |
| 3,119,668 A | * | 1/1964 | Ellman | 436/120 |
| 3,698,866 A | * | 10/1972 | Grassetti et al. | 436/120 |
| 4,111,648 A | * | 9/1978 | McConnell et al. | 8/586 |
| 4,414,414 A | * | 11/1983 | Novak | 564/271 |
| 4,931,579 A | * | 6/1990 | Heidenreich et al. | 558/29 |
| 5,700,314 A | * | 12/1997 | Kurbayashi et al. | 106/31.27 |
| 5,831,041 A | * | 11/1998 | Kunimi et al. | 534/641 |
| 6,107,100 A | * | 8/2000 | Dabovic | 436/119 |
| 6,183,549 B1 | * | 2/2001 | Wight | 106/31.51 |
| 7,399,639 B2 | * | 7/2008 | Lippard et al. | 436/81 |
| 7,585,643 B2 | * | 9/2009 | Sem | 435/15 |
| 7,820,833 B2 | * | 10/2010 | Sem et al. | 549/223 |
| 8,129,193 B2 | * | 3/2012 | He et al. | 436/120 |
| 2007/0054343 A1 | * | 3/2007 | Sem | 435/15 |
| 2007/0054410 A1 | * | 3/2007 | Sem et al. | 436/120 |
| 2010/0317119 A1 | * | 12/2010 | Sem | 436/86 |
| 2011/0039277 A1 | * | 2/2011 | Mastroberardino et al. | 435/7.1 |

OTHER PUBLICATIONS

Lewers, W. W. et al, Industrial and Engineering Chemistry 1925, 17, 1289-1290.*
Takahashi, H. et al, Journal of Physical Chemistry 1982, 86, 4660-4664.*
Nampalli, S. et al, Bioconjugate Chemistry 2002, 13, 468-473.*
Jockusch, S. et al, Photochemical & Photobiological Sciences 2006, 5, 493-498.*
Piggott, A. M. et al, Analytical Chemistry 2007, 79, 8769-8773.*
Christie, R. J. et al, Bioconjugate Chemistry 2009, 20, 476-480.*
Jonhera, Timothy, et al, "Coumarin-Fluorescein—Based FRET Probe for Real Time Quantitation of ThiolsRedox State," The FASEB Journal (2008) 22:1059.3.

* cited by examiner

*Primary Examiner* — Arlen Soderquist
(74) *Attorney, Agent, or Firm* — Jeffrey A. McKinney; McKinney Law Group APC

(57) ABSTRACT

The present invention is generally directed to thiol quantitation assays, methods of performing the assays, and compounds used in the assays. It is more specifically directed to assays that include one or more disulfides and related molecules and methods. The disulfides contain a FRET pair.

9 Claims, No Drawings

COMPOUNDS RELATED TO ASSAYS

CROSS-REFERENCE TO RELATED APPLICATION

This application is a continuation of U.S. patent application Ser. No. 12/804,739, filed Jul. 28, 2010, which claims priority to U.S. Provisional Patent Application Ser. No. 61/273,186, filed on Jul. 30, 2009, the entire disclosures of which are incorporated by reference.

FIELD OF THE INVENTION

The present invention is generally directed to thiol quantitation assays, methods of performing the assays, and compounds used in the assays. It is more specifically directed to assays that include one or more disulfides and related molecules and methods.

BACKGROUND OF THE INVENTION

Thiols play a number of important roles in cellular biochemistry. In certain cases they determine protein structure; in others they serve as covalent catalysts; in still others they maintain appropriate oxidation states of proteins and cells. Accordingly, thiol detection and quantitation is important to understanding cellular processes.

Several assays have been developed for thiol quantitation. One such assay is the Thiol and Sulfide Quantitation Kit commercialized by Invitrogen. The kit includes the following: Papain-SSCH$_3$, a disulfide-inhibited papain derivative; L-BAPNA, a chromogenic papain substrate; DTNB (Ellman's reagent) for calibrating the assay; cystamine; L-cysteine, a thiol standard; and a buffer. According to product literature, the chemical basis for the assay involves the following reactions: 1) Papain-SSCH$_3$ is activated in the presence of thiols. 2) Active papain cleaves the substrate L-BAPNA, which releases the p-nitroaniline chromophore. 3) Protein thiols exchange with cystamine to generate 2-mercaptoethylamine, which is detected.

Another thiol quantitation assay has been worked on at Marquette University by Sem and Pellela. See U.S. patent application Ser. No. 11/512,465, issued as U.S. Pat. No. 7,820,833 on Oct. 26, 2010. Their work focuses on hydroxylcoumarin-based disulfides, which reportedly react with sulfides present in the assay well. In a related publication the researches noted it was difficult to find a molecule that worked effectively in an assay framework. See, *The FASEB Journal*, 2008; 22:1049.3.

Despite the efforts discussed above, there is still a need for novel thiol quantitation assays that meet the unmet needs of various researchers.

SUMMARY OF THE INVENTION

The present invention is generally directed to thiol quantitation assays, methods of performing the assays, and compounds used in the assays. It is more specifically directed to assays that include one or more disulfides and related molecules and methods.

In a method aspect, the present invention provides a method of quantifying a thiol in a sample. The method comprises the steps of a) contacting the sample with a disulfide; and, b) detecting fluorescence from a cleavage product of the disulfide after the cleavage product has been excited. The disulfide is of the following structure:

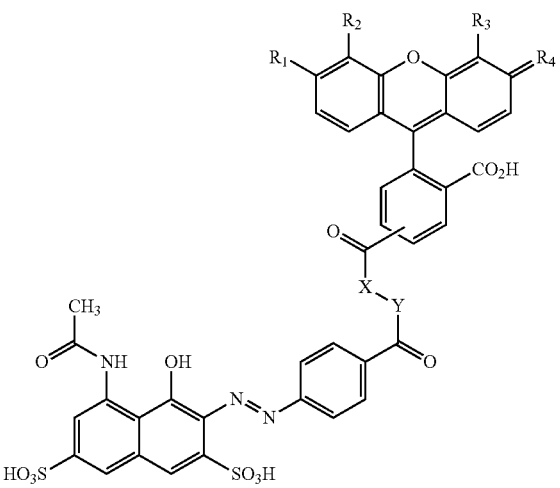

wherein $R_1$ is OH or $NH_2$, $R_2$ is H or $SO_3$—, $R_3$ is H or $SO_3$—, and $R_4$ is $NH_2+$ or O; and wherein X—Y is a symmetrical or unsymmetrical disulfide having the general structure —NH—$R_5$—SS—$R_6$—NH—, where $R_5$ and $R_6$ are either aryl groups or alkyl groups.

In a compound aspect, the present invention provides a disulfide of the following structure:

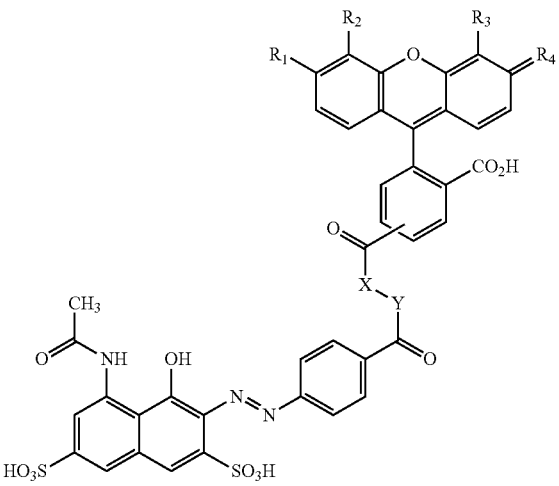

wherein $R_1$ is OH or $NH_2$, $R_2$ is H or $SO_3$—, $R_3$ is H or $SO_3$—, and $R_4$ is $NH_2+$ or O; and wherein X—Y is a symmetrical or unsymmetrical disulfide having the general structure —NH—$R_5$—SS—$R_6$—NH—, where $R_5$ and $R_6$ are either aryl groups or alkyl groups.

DETAILED DESCRIPTION OF THE INVENTION

The present assays include one or more disulfide compounds. The disulfides contain a donor-acceptor FRET pair. When the disulfide is added to an assay medium, thiols present in the medium cleave the disulfide. This allows the emission spectrum of the donor portion of the pair to be observed; a thiol is detected and can be quantified according to the intensity of the emission.

Disulfides according to the present invention have a general structure as shown below (Structure I):

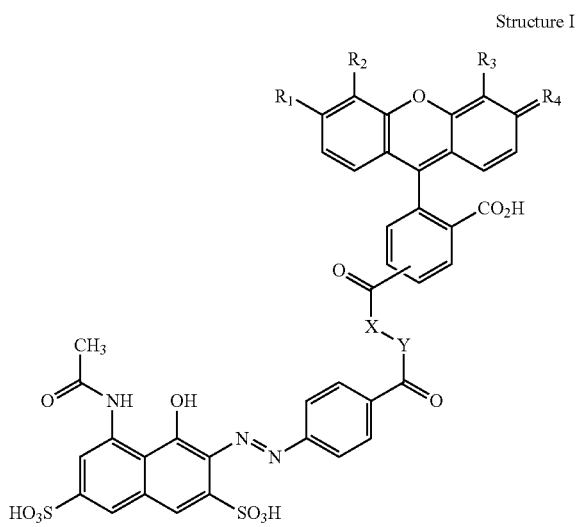

Structure I $R_1$ is OH or NH; $R_2$ is H or $SO_3-$; $R_3$ is H or $SO_3-$; and $R_4$ is O or $NH_2+$. "X—Y" is a symmetrical or unsymmetrical disulfide having the general structure —NH—$R_5$—SS—$R_6$—NH—, where $R_5$ and $R_6$ are either aryl groups or alkyl groups.

Structure II and Structure III below depict two more specific structures of disulfides of the present invention, where the substitution pattern on one aryl moiety is defined. The substituents for these structures are the same as for Structure I.

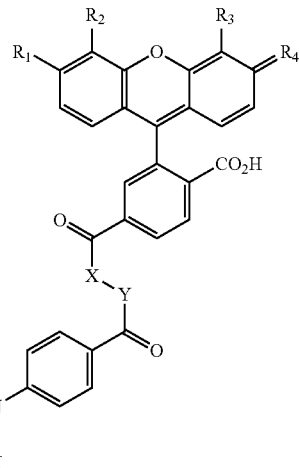

Structure III

Structure IV and Structure V below depict two still more specific structures of disulfides of the present invention, where the substitution pattern on one aryl moiety and the tricyclic moiety are defined. Substituents "X—Y" for these structures are the same as for Structure I.

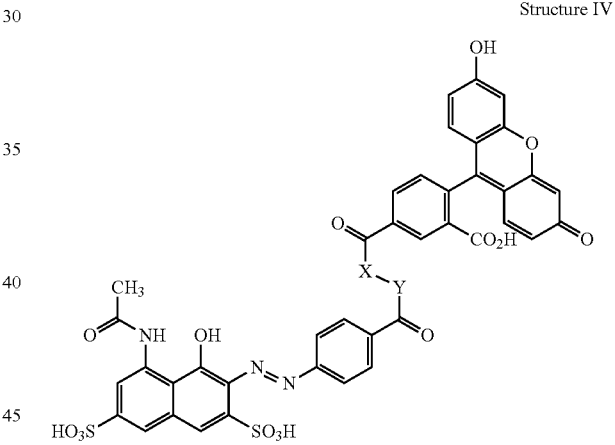

Structure IV

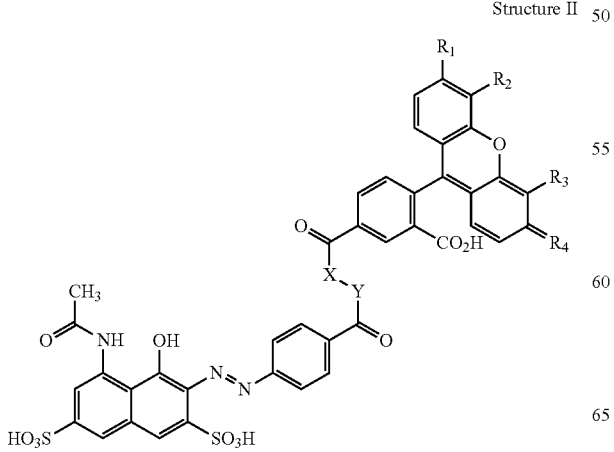

Structure II

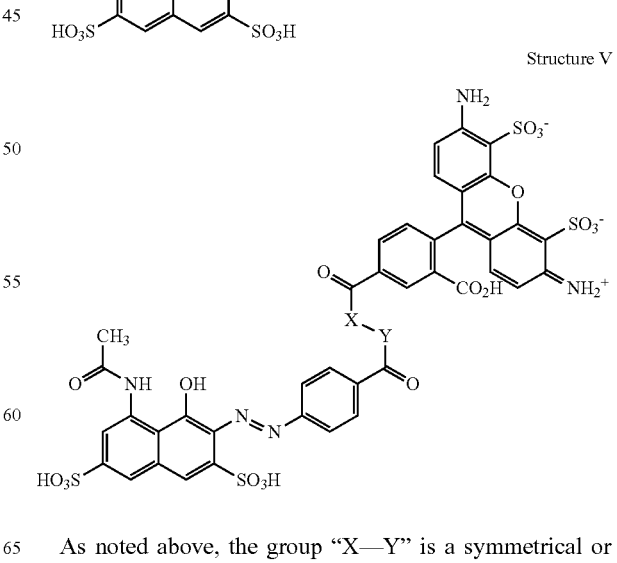

Structure V

As noted above, the group "X—Y" is a symmetrical or unsymmetrical disulfide having the general structure —NH—$R_5$—SS—$R_6$—NH—, where $R_5$ and $R_6$ are either aryl groups or alkyl groups. The aryl groups can be unsubstituted aryl groups, substituted aryl groups, unsubstituted heteroaryl groups and substituted heteroaryl groups. An unsubstituted aryl group is represented by Structure VI, Structure VII or Structure VIII below.

Structure VI

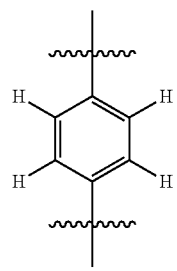

Structure VII

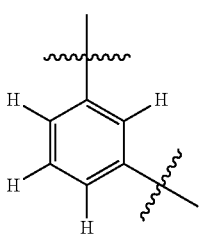

Structure VIII

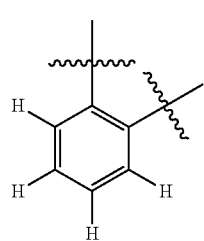

A substituted aryl group is represented by Structure IX, Structure X or Structure XI below.

Structure IX

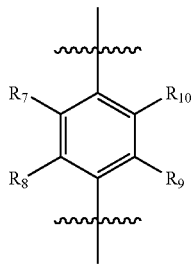

Structure X

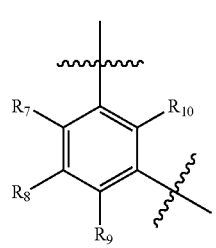

Structure XI

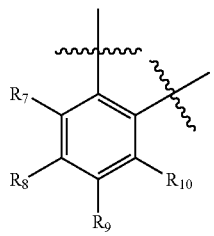

$R_7$, $R_8$, $R_9$ and $R_{10}$ are independently selected from the group consisting of H, $CH_3$, $CH_2CH_3$, $CH_2CH_2CH_3$, $CH(CH_3)_2$, F, Cl, Br, I, CN, $OCH_3$, $OCH_2CH_3$, $CO_2CH_3$, $CO_2CH_2CH_3$, $N(CH_3)_2$, $N(CH_2CH_3)_2$, $SCH_3$, $SCH_2CH_3$; at least one of the substituents is not H.

An unsubstituted heteroaryl group is represented by Structure XII, Structure XIII, Structure XIV, Structure XV, Structure XVI, Structure XVII, Structure XVIII, Structure XIX and Structure XX below.

Structure XII

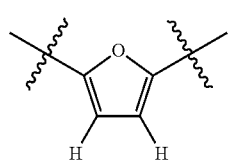

Structure XIII

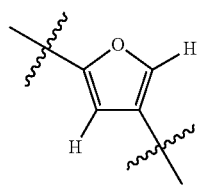

Structure XIV

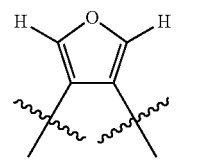

Structure XV

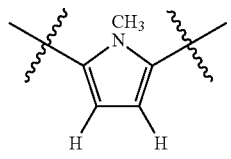

Structure XVI

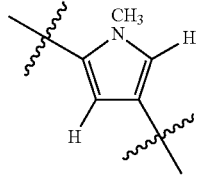

Structure XVII

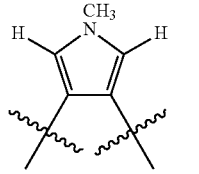

-continued

Structure XVIII

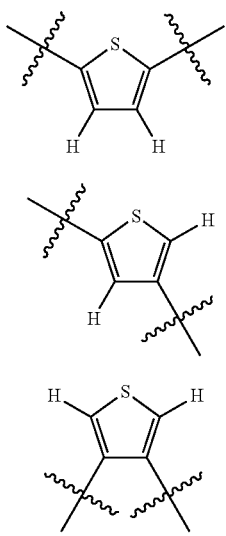

Structure XIX

Structure XX

A substituted heteroaryl group is represented by Structure XXI, Structure XXII, Structure XXIII, Structure XXIV, Structure XXV, Structure XXVI, Structure XXVII, Structure XXVIII and Structure XXIX below.

Structure XXI

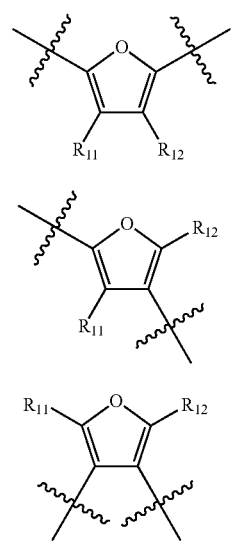

Structure XXII

Structure XXIII

Structure XXIV

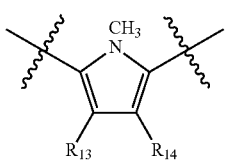

$R_{11}$ and $R_{12}$ are independently selected from the group consisting of H, $CH_3$, $CH_2CH_3$, $CH_2CH_2CH_3$, $CH(CH_3)_2$, F, Cl, Br, I, CN, $OCH_3$, $OCH_2CH_3$, $CO_2CH_3$, $CO_2CH_2CH_3$, $N(CH_3)_2$, $N(CH_2CH_3)_2$, $SCH_3$, $SCH_2CH_3$; at least one of the substituents is not H.

Structure XXV

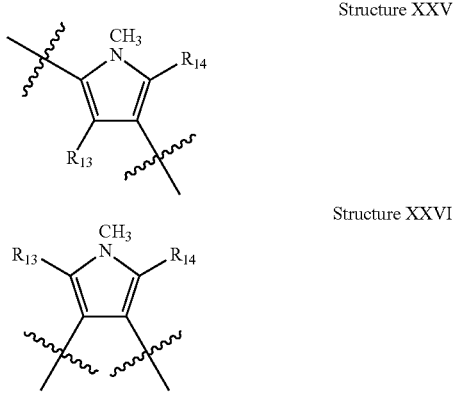

Structure XXVI $R_{13}$ and $R_{14}$ are independently selected from the group consisting of H, $CH_3$, $CH_2CH_3$, $CH_2CH_2CH_3$, $CH(CH_3)_2$, F, Cl, Br, I, CN, $OCH_3$, $OCH_2CH_3$, $CO_2CH_3$, $CO_2CH_2CH_3$, $N(CH_3)_2$, $N(CH_2CH_3)_2$, $SCH_3$, $SCH_2CH_3$; at least one of the substituents is not H.

Structure XXVII

Structure XXVIII

Structure XXIX $R_{15}$ and $R_{16}$ are independently selected from the group consisting of H, $CH_3$, $CH_2CH_3$, $CH_2CH_2CH_3$, $CH(CH_3)_2$, F, Cl, Br, I, CN, $OCH_3$, $OCH_2CH_3$, $CO_2CH_3$, $CO_2CH_2CH_3$, $N(CH_3)_2$, $N(CH_2CH_3)_2$, $SCH_3$, $SCH_2CH_3$; at least one of the substituents is not H.

Where $R_5$ and/or $R_6$ are alkyl groups, the alkyl groups can be unsubstituted alkyl groups, substituted alkyl groups and heteroalkyl groups. The following are non-limiting examples of unsubstituted alkyl groups: —$CH_2CH_2$—; —$CH_2CH_2CH_2$—; —$CH(CH_3)CH_2$—; —$CH(CH_3)CH_2CH_2$—; —$CH_2CH(CH_3)CH_2$—. The following are non-limiting examples of substituted alkyl groups: —$CH(CO_2CH_3)CH_2$—; —$CH(CO_2CH_2CH_3)CH_2$—; —$CH_2CH(OCH_3)CH_2$—; —$CH_2CH(CN)CH_2$—; —$CH_2CH(CO_2CH_3)CH_2$—; —$CH_2CH(CH_2CO_2CH_3)CH_2$—; —$CH_2CH(OCH_3)CH_2CH_2$—. The following are non-limiting examples of heteroalkyl groups: —$CH_2CH_2$—O—$CH_2CH_2$—; —$CH_2CH_2$—N[C(O)CH_3]—$CH_2CH_2$—; —$CH_2CH_2$—S—$CH_2CH_2$—.

The group "X—Y" is symmetrical or asymmetrical. Non-limiting examples of such groups are: —NH—CH$_2$CH$_2$—SS—CH$_2$CH$_2$—NH—; —NH—(C$_6$H$_4$)—SS—(C$_6$H$_4$)—NH—; —NH—CH$_2$CH$_2$—SS—(C$_6$H$_4$)—NH—; —NH—(C$_6$H$_4$)—SS—CH$_2$CH$_2$—NH—; —NH—CH$_2$CH$_2$—SS—CH$_2$CH$_2$CH$_2$—NH—; —NH—CH$_2$CH$_2$CH$_2$—SS—CH$_2$CH$_2$—NH—; —NH—CH$_2$CH$_2$CH$_2$—SS—CH$_2$CH$_2$CH$_2$—NH—; —NH—CH$_2$CH$_2$CH$_2$CH$_2$—SS—CH$_2$CH$_2$—NH—; —NH—CH$_2$CH$_2$CH$_2$CH$_2$—SS—CH$_2$CH$_2$CH$_2$—NH—; —NH—CH$_2$CH$_2$CH$_2$CH$_2$—SS—CH$_2$CH$_2$CH$_2$CH$_2$—NH—; —NH—CH$_2$CH$_2$OCH$_2$CH$_2$—SS—CH$_2$CH$_2$—NH—; —NH—CH$_2$CH$_2$OCH$_2$CH$_2$—SS—CH$_2$CH$_2$CH$_2$—NH—; —NH—CH$_2$CH$_2$OCH$_2$CH$_2$—SS—CH$_2$CH$_2$CH$_2$CH$_2$—NH—; —NH—CH$_2$CH$_2$OCH$_2$CH$_2$—SS—CH$_2$CH$_2$CH$_2$CH$_2$—NH—; —NH—CH$_2$CH$_2$—SS—CH$_2$CH$_2$OCH$_2$CH$_2$—NH—; —NHCH$_2$CH$_2$CH$_2$—SS—CH$_2$CH$_2$OCH$_2$CH$_2$NH—; —NHCH$_2$CH$_2$CH$_2$CH$_2$—SS—CH$_2$CH$_2$OCH$_2$CH$_2$NH—; —NH—CH$_2$CH$_2$—SS—(C$_4$H$_2$O)—NH—; —NH—CH$_2$CH$_2$CH$_2$—SS—(C$_4$H$_2$O)—NH—; —NH—CH$_2$CH$_2$CH$_2$CH$_2$—SS—(C$_4$H$_2$O)—NH—; —NH—CH$_2$CH$_2$OCH$_2$CH$_2$—SS—(C$_4$H$_2$O)—NH—; —NH—(C$_4$H$_2$O)—SS—CH$_2$CH$_2$—NH—; —NH—(C$_4$H$_2$O)—SS—CH$_2$CH$_2$CH$_2$—NH—; —NH—(C$_4$H$_2$O)—SS—CH$_2$CH$_2$CH$_2$CH$_2$—NH—; —NH—(C$_4$H$_2$O)—SS—CH$_2$CH$_2$OCH$_2$CH$_2$—NH—; —NH(C$_4$H$_2$O)—SS—(C$_4$H$_2$O)—NH—; —NH—CH$_2$CH$_2$—SS—(C$_4$H$_2$S)—NH—; —NH—CH$_2$CH$_2$CH$_2$—SS—(C$_4$H$_2$S)—NH—; —NH—CH$_2$CH$_2$CH$_2$CH$_2$—SS—(C$_4$H$_2$S)—NH—; —NH—CH$_2$CH$_2$OCH$_2$CH$_2$—SS—(C$_4$H$_2$S)—NH—; —NH—(C$_4$H$_2$S)—SS—CH$_2$CH$_2$—NH—; —NH—(C$_4$H$_2$S)—SS—CH$_2$CH$_2$CH$_2$—NH—; —NH—(C$_4$H$_2$S)—SS—CH$_2$CH$_2$CH$_2$CH$_2$—NH—; —NH—(C$_4$H$_2$S)—SS—CH$_2$CH$_2$OCH$_2$CH$_2$—NH—; —NH(C$_4$H$_2$S)—SS—(C$_4$H$_2$S)—NH—.

Referring to Structure II, the following are non-limiting examples of disulfides according to the present invention:

Example 1

$R_1$ is $NH_2$; $R_2$ is $SO_3-$; $R_3$ is $SO_3-$; $R_4$ is $NH_2+$; X—Y is —NH—CH$_2$CH$_2$—SS—CH$_2$CH$_2$—NH—.

Example 2

$R_1$ is $NH_2$; $R_2$ is $SO_3-$; $R_3$ is $SO_3-$; $R_4$ is $NH_2+$; X—Y is —NH—(pC$_6$H$_4$)—SS—(pC$_6$H$_4$)—NH—.

Example 3

$R_1$ is $NH_2$; $R_2$ is $SO_3-$; $R_3$ is $SO_3-$; $R_4$ is $NH_2+$; X—Y is —NH—CH$_2$CH$_2$—SS—CH$_2$CH$_2$CH$_2$—NH—.

Example 4

$R_1$ is $NH_2$; $R_2$ is $SO_3-$; $R_3$ is $SO_3-$; $R_4$ is $NH_2+$; X—Y is —NH—CH$_2$CH$_2$CH$_2$—SS—CH$_2$CH$_2$—NH—.

Example 5

$R_1$ is $NH_2$; $R_2$ is $SO_3-$; $R_3$ is $SO_3-$; $R_4$ is $NH_2+$; X—Y is —NH—CH$_2$CH$_2$—SS—(pC$_6$H$_4$)—NH—.

Example 6

$R_1$ is $NH_2$; $R_2$ is $SO_3-$; $R_3$ is $SO_3-$; $R_4$ is $NH_2+$; X—Y is —NH—(pC$_6$H$_4$)—SS—CH$_2$CH$_2$—NH—.

Example 7

$R_1$ is OH; $R_2$ is H; $R_3$ is H; $R_4$ is O; XY is —NHCH$_2$CH$_2$—SS—CH$_2$CH$_2$—NH—.

Example 8

$R_1$ is OH; $R_2$ is H; $R_3$ is H; $R_4$ is O; XY is —NH—(pC$_6$H$_4$)—SS—(pC$_6$H$_4$)—NH—.

Example 9

$R_1$ is OH; $R_2$ is H; $R_3$ is H; $R_4$ is O; XY is —NH—CH$_2$CH$_2$—SS—CH$_2$CH$_2$CH$_2$—NH—.

Example 10

$R_1$ is OH; $R_2$ is H; $R_3$ is H; $R_4$ is O; XY is —NH—CH$_2$CH$_2$CH$_2$—SS—CH$_2$CH$_2$—NH—.

Example 11

$R_1$ is OH; $R_2$ is H; $R_3$ is H; $R_4$ is O; XY is —NH—CH$_2$CH$_2$—SS—(pC$_6$H$_4$)—NH—.

Example 12

$R_1$ is OH; $R_2$ is H; $R_3$ is H; $R_4$ is O; XY is —NH—(pC$_6$H$_4$)—SS—CH$_2$CH$_2$—NH—.

Referring to Structure III, the following are non-limiting examples of disulfides according to the present invention:

Example 13

$R_1$ is $NH_2$; $R_2$ is $SO_3-$; $R_3$ is $SO_3-$; $R_4$ is $NH_2+$; X—Y is —NH—CH$_2$CH$_2$—SS—CH$_2$CH$_2$—NH—.

Example 14

$R_1$ is $NH_2$; $R_2$ is $SO_3-$; $R_3$ is $SO_3-$; $R_4$ is $NH_2+$; X—Y is —NH—(pC$_6$H$_4$)—SS—(pC$_6$H$_4$)—NH—.

Example 15

$R_1$ is $NH_2$; $R_2$ is $SO_3-$; $R_3$ is $SO_3-$; $R_4$ is $NH_2+$; X—Y is —NH—CH$_2$CH$_2$—SS—CH$_2$CH$_2$CH$_2$—NH—.

Example 16

$R_1$ is $NH_2$; $R_2$ is $SO_3-$; $R_3$ is $SO_3-$; $R_4$ is $NH_2+$; X—Y is —NH—CH$_2$CH$_2$CH$_2$—SS—CH$_2$CH$_2$—NH—.

Example 17

$R_1$ is $NH_2$; $R_2$ is $SO_3-$; $R_3$ is $SO_3-$; $R_4$ is $NH_2+$; X—Y is —NH—CH$_2$CH$_2$—SS—(pC$_6$H$_4$)—NH—.

Example 18

$R_1$ is $NH_2$; $R_2$ is $SO_3-$; $R_3$ is $SO_3-$; $R_4$ is $NH_2+$; X—Y is —NH—(pC$_6$H$_4$)—SS—CH$_2$CH$_2$—NH—.

Example 19

$R_1$ is OH; $R_2$ is H; $R_3$ is H; $R_4$ is O; XY is —NHCH$_2$CH$_2$—SS—CH$_2$CH$_2$—NH—.

Example 20

$R_1$ is OH; $R_2$ is H; $R_3$ is H; $R_4$ is O; XY is —NH—(pC$_6$H$_4$)—SS—(pC$_6$H$_4$)—NH—.

Example 21

$R_1$ is OH; $R_2$ is H; $R_3$ is H; $R_4$ is O; XY is —NH—CH$_2$CH$_2$—SS—CH$_2$CH$_2$CH$_2$—NH—.

Example 22

$R_1$ is OH; $R_2$ is H; $R_3$ is H; $R_4$ is O; XY is —NH—CH$_2$CH$_2$CH$_2$—SS—CH$_2$CH$_2$—NH—.

Example 23

$R_1$ is OH; $R_2$ is H; $R_3$ is H; $R_4$ is O; XY is —NH—CH$_2$CH$_2$—SS—(pC$_6$H$_4$)—NH—.

Example 24

$R_1$ is OH; $R_2$ is H; $R_3$ is H; $R_4$ is O; XY is —NH—(pC$_6$H$_4$)—SS—CH$_2$CH$_2$—NH—.

The disulfides of the present invention are synthesized according to methods known to those skilled in the art. Examples of reaction types that are used to synthesize the disulfides can be found in U.S. patent application Ser. No. 11/512,485, issued as U.S. Pat. No. 7,820,833 on Oct. 26, 2010, which is incorporated-by-reference into this document for all purposes. One such reaction type is a condensation of a diamine (e.g., H$_2$N—CH$_2$CH$_2$—SS—CH$_2$CH$_2$NH$_2$ and H$_2$N—(C$_6$H$_4$)—SS—(C$_6$H$_4$)—NH$_2$) with an activated carboxylic acid moiety of a FRET pair donor and a FRET pair acceptor, which is typically performed in two separate synthetic steps.

Assays of the present invention are performed by bringing a disulfide of the present invention in contact with a sample thought to include one or more types of thiols. As noted above, the disulfides contain a donor-acceptor FRET pair. When the disulfide is added to the sample, thiols present in the sample cleave the disulfide. Cleavage ensures that the acceptor no longer quenches the emission spectrum of the donor portion of the FRET pair. Excitation of the donor accordingly results in fluorescence, which can be measured.

The invention claimed is:

1. A compound, wherein the compound is of the following structure:

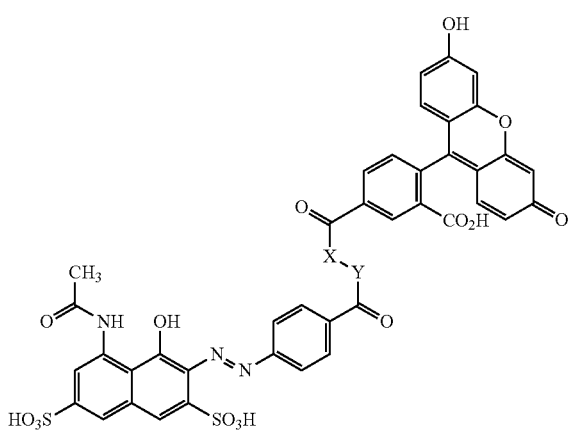

wherein X—Y is a symmetrical or unsymmetrical disulfide selected from the following group of disulfides: —NH—CH$_2$CH$_2$—SS—CH$_2$CH$_2$NH—; —NH—(C$_6$H$_4$)—SS—(C$_6$H$_4$)—NH—; —NH—CH$_2$CH$_2$—SS—(C$_6$H$_4$)—NH—; —NH—(C$_6$H$_4$)—SS—CH$_2$CH$_2$—NH—; —NH—CH$_2$CH$_2$—SS—CH$_2$CH$_2$CH$_2$—NH—; —NH—CH$_2$CH$_2$CH$_2$—SS—CH$_2$CH$_2$—NH—; —NH—CH$_2$CH$_2$CH$_2$—SS—CH$_2$CH$_2$CH$_2$—NH—; —NH—CH$_2$CH$_2$CH$_2$CH$_2$—SS—CH$_2$CH$_2$—NH—; —NHCH$_2$CH$_2$CH$_2$CH$_2$—SS—CH$_2$CH$_2$CH$_2$—NH—; —NH—CH$_2$CH$_2$CH$_2$CH$_2$—SS—CH$_2$CH$_2$CH$_2$CH$_2$—NH—; —NH—CH$_2$CH$_2$OCH$_2$CH$_2$—SS—CH$_2$CH$_2$—NH—; —NH—CH$_2$CH$_2$OCH$_2$CH$_2$—SS—CH$_2$CH$_2$CH$_2$—NH—; —NH—CH$_2$CH$_2$OCH$_2$CH$_2$—SS—CH$_2$CH$_2$CH$_2$CH$_2$—NH—; —NH—CH$_2$CH$_2$OCH$_2$CH$_2$—SS—CH$_2$CH$_2$OCH$_2$CH$_2$—NH—; —NH—CH$_2$CH$_2$—SS—CH$_2$CH$_2$OCH$_2$CH$_2$—NH; —NH—CH$_2$CH$_2$CH$_2$—SS—CH$_2$CH$_2$OCH$_2$CH$_2$—NH—; —NH—CH$_2$CH$_2$CH$_2$CH$_2$—SS—CH$_2$CH$_2$OCH$_2$CH$_2$—NH—; —NH—CH$_2$CH$_2$—SS—(C$_4$H$_2$O)—NH—; —NH—CH$_2$CH$_2$CH$_2$—SS—(C$_4$H$_2$O)—NH—; —NH—CH$_2$CH$_2$CH$_2$CH$_2$—SS—(C$_4$H$_2$O)—NH—; —NH—CH$_2$CH$_2$OCH$_2$CH$_2$—SS—(C$_4$H$_2$O)—NH—; —NH—(C$_4$H$_2$O)—SS—CH$_2$CH$_2$—NH—; —NH—(C$_4$H$_2$O)—SS—CH$_2$CH$_2$CH$_2$—NH—; —NH—(C$_4$H$_2$O)—SS—CH$_2$CH$_2$CH$_2$CH$_2$—NH—; —NH—(C$_4$H$_2$O)—SS—CH$_2$CH$_2$OCH$_2$CH$_2$—NH—; —NH—(C$_4$H$_2$O)—SS—(C$_4$H$_2$O)—NH—; —NH—CH$_2$CH$_2$—SS—(C$_4$H$_2$S)—NH—; —NH—CH$_2$CH$_2$CH$_2$—SS—(C$_4$H$_2$S)—NH—; —NH—CH$_2$CH$_2$CH$_2$CH$_2$—SS—(C$_4$H$_2$S)—NH—; —NH—CH$_2$CH$_2$OCH$_2$CH$_2$—SS—(C$_4$H$_2$S)—NH—; —NH—(C$_4$H$_2$S)—SS—CH$_2$CH$_2$—NH—; —NH—(C$_4$H$_2$S)—SS—CH$_2$CH$_2$CH$_2$—NH—; —NH—(C$_4$H$_2$S)—SS—CH$_2$CH$_2$CH$_2$CH$_2$—NH—; —NH—(C$_4$H$_2$S)—SS—CH$_2$CH$_2$OCH$_2$CH$_2$—NH—; —NH—(C$_4$H$_2$S)—SS—(C$_4$H$_2$S)—NH—.

2. The compound according to claim 1, wherein X—Y is a symmetrical or unsymmetrical disulfide selected from the following group of disulfides: —NH—CH$_2$CH$_2$—SS—CH$_2$CH$_2$NH—; —NH—(C$_6$H$_4$)—SS—(C$_6$H$_4$)—NH—; —NH—CH$_2$CH$_2$—SS—(C$_6$H$_4$)—NH—; —NH—(C$_6$H$_4$)—SS—CH$_2$CH$_2$—NH—; —NH—CH$_2$CH$_2$—SS—CH$_2$CH$_2$CH$_2$—NH—; —NH—CH$_2$CH$_2$CH$_2$—SS—CH$_2$CH$_2$—NH—; —NH—CH$_2$CH$_2$CH$_2$—SS—CH$_2$CH$_2$CH$_2$—NH—; —NH—CH$_2$CH$_2$CH$_2$CH$_2$—SS—CH$_2$CH$_2$—NH—; —NHCH$_2$CH$_2$CH$_2$CH$_2$—SS—CH$_2$CH$_2$CH$_2$—NH—; —NH—CH$_2$CH$_2$CH$_2$CH$_2$—SS—CH$_2$CH$_2$CH$_2$CH$_2$—NH—.

3. The compound according to claim 2, wherein X—Y is a symmetrical or unsymmetrical disulfide selected from the following group of disulfides: —NH—CH$_2$CH$_2$—SS—CH$_2$CH$_2$NH—; —NH—(C$_6$H$_4$)—SS—(C$_6$H$_4$)—NH—; —NH—CH$_2$CH$_2$—SS—(C$_6$H$_4$)—NH—; —NH—(C$_6$H$_4$)—SS—CH$_2$CH$_2$—NH—; —NH—CH$_2$CH$_2$—SS—CH$_2$CH$_2$CH$_2$—NH—; —NH—CH$_2$CH$_2$CH$_2$—SS—CH$_2$CH$_2$—NH—; —NH—CH$_2$CH$_2$CH$_2$—SS—CH$_2$CH$_2$CH$_2$—NH—.

4. A compound, wherein the compound is of the following structure:

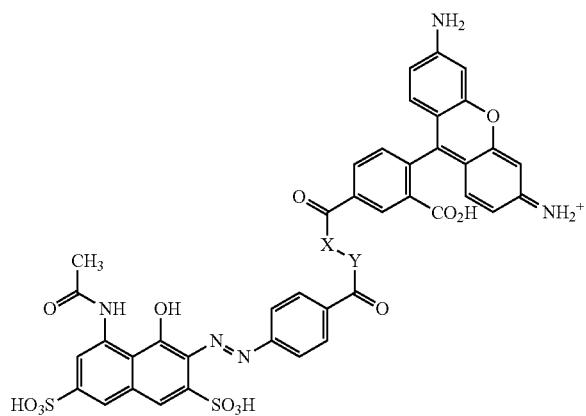

wherein X—Y is a symmetrical or unsymmetrical disulfide selected from the following group of disulfides: —NH—CH₂CH₂—SS—CH₂CH₂NH—; —NH—(C₆H₄)—SS—(C₆H₄)—NH—; —NH—CH₂CH₂—SS—(C₆H₄)—NH—; —NH—(C₆H₄)—SS—CH₂CH₂—NH—; —NH—CH₂CH₂—SS—CH₂CH₂CH₂—NH—; —NH—CH₂CH₂CH₂—SS—CH₂CH₂—NH—; —NH—CH₂CH₂CH₂—SS—CH₂CH₂CH₂—NH—; —NH—CH₂CH₂CH₂CH₂—SS—CH₂CH₂—NH—; —NHCH₂CH₂CH₂CH₂—SS—CH₂CH₂CH₂—NH—; —NH—CH₂CH₂CH₂CH₂—SS—CH₂CH₂CH₂CH₂—NH—; —NH—CH₂CH₂OCH₂CH₂—SS—CH₂CH₂—NH—; —NH—CH₂CH₂OCH₂CH₂—SS—CH₂CH₂CH₂—NH—; —NH—CH₂CH₂OCH₂CH₂—SS—CH₂CH₂CH₂CH₂—NH—; —NH—CH₂CH₂OCH₂CH₂—SS—CH₂CH₂OCH₂CH₂—NH—; —NH—CH₂CH₂—SS—CH₂CH₂OCH₂CH₂—NH; —NH—CH₂CH₂CH₂—SS—CH₂CH₂OCH₂CH₂—NH—; —NH—CH₂CH₂CH₂CH₂—SS—CH₂CH₂OCH₂CH₂—NH—; —NH—CH₂CH₂—SS—(C₄H₂O)—NH—; —NH—CH₂CH₂CH₂—SS—(C₄H₂O)—NH—; —NH—CH₂CH₂CH₂CH₂—SS—(C₄H₂O)—NH—; —NH—CH₂CH₂OCH₂CH₂—SS—(C₄H₂O)—NH—; —NH—(C₄H₂O)—SS—CH₂CH₂—NH—; —NH—(C₄H₂O)—SS—CH₂CH₂CH₂—NH—; —NH—(C₄H₂O)—SS—CH₂CH₂CH₂CH₂—NH—; —NH—(C₄H₂O)—SS—CH₂CH₂OCH₂CH₂—NH—; —NH—(C₄H₂O)—SS—(C₄H₂O)—NH—; —NH—CH₂CH₂—SS—(C₄H₂S)—NH—; —NH—CH₂CH₂CH₂—SS—(C₄H₂S)—NH—; —NH—CH₂CH₂CH₂CH₂—SS—(C₄H₂S)—NH—; —NH—CH₂CH₂OCH₂CH₂—SS—(C₄H₂S)—NH—; —NH—(C₄H₂S)—SS—CH₂CH₂—NH—; —NH—(C₄H₂S)—SS—CH₂CH₂CH₂—NH—; —NH—(C₄H₂S)—SS—CH₂CH₂CH₂CH₂—NH—; —NH—(C₄H₂S)—SS—CH₂CH₂OCH₂CH₂—NH—; —NH—(C₄H₂S)—SS—(C₄H₂S)—NH—.

5. The compound according to claim 4, wherein X—Y is a symmetrical or unsymmetrical disulfide selected from the following group of disulfides: —NH—CH₂CH₂—SS—CH₂CH₂NH—; —NH—(C₆H₄)—SS—(C₆H₄)—NH—; —NH—CH₂CH₂—SS—(C₆H₄)—NH—; —NH—(C₆H₄)—SS—CH₂CH₂—NH—; —NH—CH₂CH₂—SS—CH₂CH₂CH₂—NH—; —NH—CH₂CH₂CH₂—SS—CH₂CH₂—NH—; —NH—CH₂CH₂CH₂—SS—CH₂CH₂CH₂—NH—; —NH—CH₂CH₂CH₂CH₂—SS—CH₂CH₂—NH—; —NHCH₂CH₂CH₂CH₂—SS—CH₂CH₂CH₂—NH—; —NH—CH₂CH₂CH₂CH₂—SS—CH₂CH₂CH₂CH₂—NH—.

6. The compound according to claim 5, wherein X—Y is a symmetrical or unsymmetrical disulfide selected from the following group of disulfides: —NH—CH₂CH₂—SS—CH₂CH₂NH—; —NH—(C₆H₄)—SS—(C₆H₄)—NH—; —NH—CH₂CH₂—SS—(C₆H₄)—NH—; —NH—(C₆H₄)—SS—CH₂CH₂—NH—; —NH—CH₂CH₂—SS—CH₂CH₂CH₂—NH—; —NH—CH₂CH₂CH₂—SS—CH₂CH₂—NH—; —NH—CH₂CH₂CH₂—SS—CH₂CH₂CH₂—NH—.

7. A compound, wherein the compound is of the following structure:

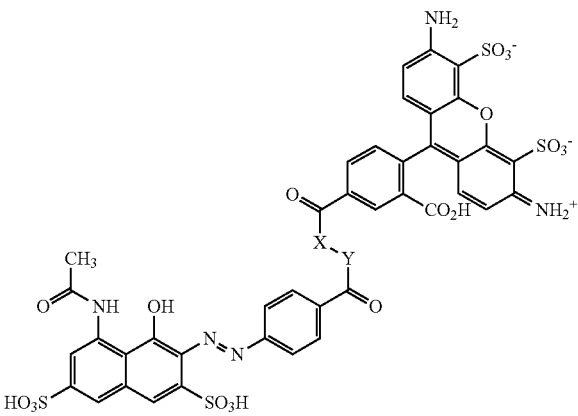

wherein X—Y is a symmetrical or unsymmetrical disulfide selected from the following group of disulfides: —NH—CH₂CH₂—SS—CH₂CH₂NH—; —NH—(C₆H₄)—SS—(C₆H₄)—NH—; —NH—CH₂CH₂—SS—(C₆H₄)—NH—; —NH—(C₆H₄)—SS—CH₂CH₂—NH—; —NH—CH₂CH₂—SS—CH₂CH₂CH₂—NH—; —NH—CH₂CH₂CH₂—SS—CH₂CH₂—NH—; —NH—CH₂CH₂CH₂—SS—CH₂CH₂CH₂—NH—; —NH—CH₂CH₂CH₂CH₂—SS—CH₂CH₂—NH—; —NHCH₂CH₂CH₂CH₂—SS—CH₂CH₂CH₂—NH—; —NH—CH₂CH₂CH₂CH₂—SS—CH₂CH₂CH₂CH₂—NH—; —NH—CH₂CH₂OCH₂CH₂—SS—CH₂CH₂—NH—; —NH—CH₂CH₂OCH₂CH₂—SS—CH₂CH₂CH₂—NH—; —NH—CH₂CH₂OCH₂CH₂—SS—CH₂CH₂CH₂CH₂—NH—; —NH—CH₂CH₂OCH₂CH₂—SS—CH₂CH₂OCH₂CH₂—NH—; —NH—CH₂CH₂—SS—CH₂CH₂OCH₂CH₂—NH; —NH—CH₂CH₂CH₂—SS—CH₂CH₂OCH₂CH₂—NH—; —NH—CH₂CH₂CH₂CH₂—SS—CH₂CH₂OCH₂CH₂—NH—; —NH—CH₂CH₂—SS—(C₄H₂O)—NH—; —NH—CH₂CH₂CH₂—SS—(C₄H₂O)—NH—; —NH—CH₂CH₂CH₂CH₂—SS—(C₄H₂O)—NH—; —NH—CH₂CH₂OCH₂CH₂—SS—(C₄H₂O)—NH—; —NH—(C₄H₂O)—SS—CH₂CH₂—NH—; —NH—

$(C_4H_2O)$—SS—$CH_2CH_2CH_2$—NH—; —NH—$(C_4H_2O)$—SS—$CH_2CH_2CH_2CH_2$—NH—; —NH—$(C_4H_2O)$—SS—$CH_2CH_2OCH_2CH_2$—NH—; —NH—$(C_4H_2O)$—SS—$(C_4H_2O)$—NH—; —NH—$CH_2CH_2$—SS—$(C_4H_2S)$—NH—; —NH—$CH_2CH_2CH_2$—SS—$(C_4H_2S)$—NH—; —NH—$CH_2CH_2CH_2CH_2$—SS—$(C_4H_2S)$—NH—; —NH—$CH_2CH_2OCH_2CH_2$—SS—$(C_4H_2S)$—NH—; —NH—$(C_4H_2S)$—SS—$CH_2CH_2$—NH—; —NH—$(C_4H_2S)$—SS—$CH_2CH_2CH_2$—NH—; —NH—$(C_4H_2S)$—SS—$CH_2CH_2CH_2CH_2$—NH—; —NH—$(C_4H_2S)$—SS—$CH_2CH_2OCH_2CH_2$—NH—; —NH—$(C_4H_2S)$—SS—$(C_4H_2S)$—NH—.

8. The compound according to claim 7, wherein X—Y is a symmetrical or unsymmetrical disulfide selected from the following group of disulfides: —NH—$CH_2CH_2$—SS—$CH_2CH_2$NH—; —NH—$(C_6H_4)$—SS—$(C_6H_4)$—NH—; —NH—$CH_2CH_2$—SS—$(C_6H_4)$—NH—; —NH—$(C_6H_4)$—SS—$CH_2CH_2$—NH—; —NH—$CH_2CH_2CH_2$—NH—; —NH—$CH_2CH_2CH_2$—SS—$CH_2CH_2$—NH—; —NH—$CH_2CH_2CH_2$—SS—$CH_2CH_2CH_2$—NH—; —NH—$CH_2CH_2CH_2CH_2$—SS—$CH_2CH_2$—NH—; —NH—$CH_2CH_2CH_2$—SS—$CH_2CH_2CH_2$—NH—; —NH$CH_2CH_2CH_2CH_2$—SS—$CH_2CH_2CH_2$—NH—; —NH—$CH_2CH_2CH_2CH_2$—SS—$CH_2CH_2CH_2CH_2$—NH—.

9. The compound according to claim 8, wherein X—Y is a symmetrical or unsymmetrical disulfide selected from the following group of disulfides: —NH—$CH_2CH_2$—SS—$CH_2CH_2$NH—; —NH—$(C_6H_4)$—SS—$(C_6H_4)$—NH—; —NH—$CH_2CH_2$—SS—$(C_6H_4)$—NH—; —NH—$(C_6H_4)$—SS—$CH_2CH_2$—NH—; —NH—$CH_2CH_2$—SS—$CH_2CH_2CH_2$—NH—; —NH—$CH_2CH_2CH_2$—SS—$CH_2CH_2$—NH—; —NH—$CH_2CH_2CH_2$—SS—$CH_2CH_2CH_2$—NH—.

* * * * *